June 24, 1924.
F. E. KLINE
1,498,692
DIRIGIBLE HEADLIGHT CONSTRUCTION FOR MOTOR VEHICLES
Filed July 14, 1923
2 Sheets-Sheet 1
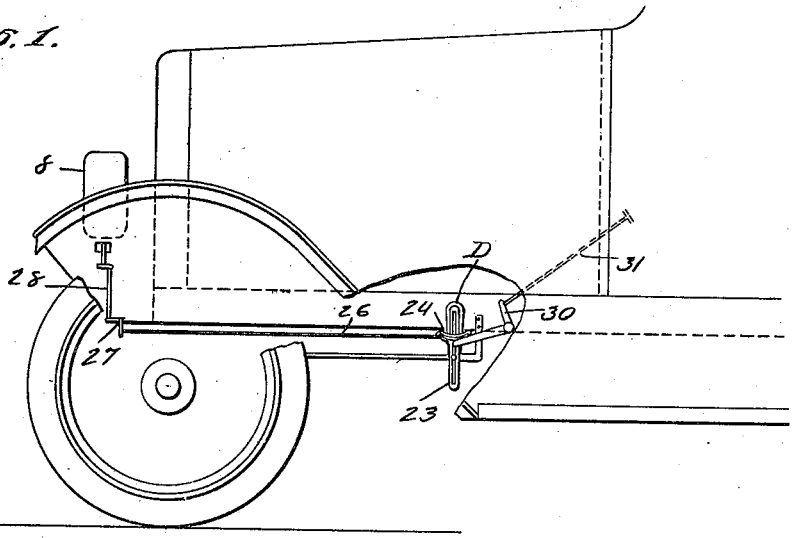
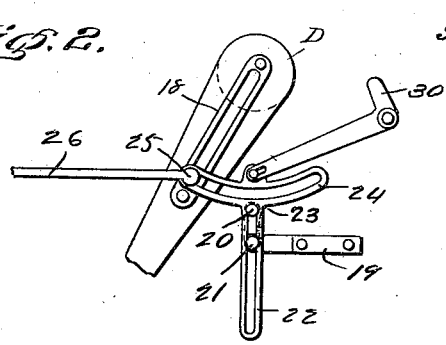
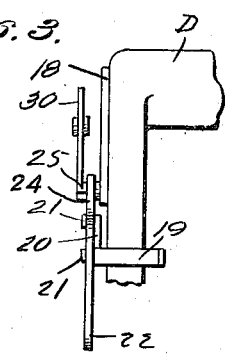
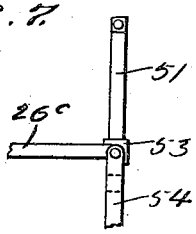
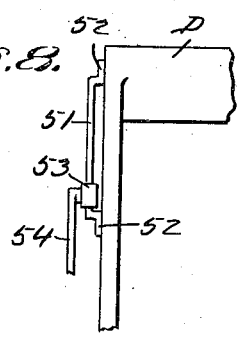
Inventor
Floyd E. Kline.
By Clarence A. O'Brien.
Attorney June 24, 1924.
F. E. KLINE
1,498,692
DIRIGIBLE HEADLIGHT CONSTRUCTION FOR MOTOR VEHICLES
Filed July 14, 1923   2 Sheets-Sheet 2
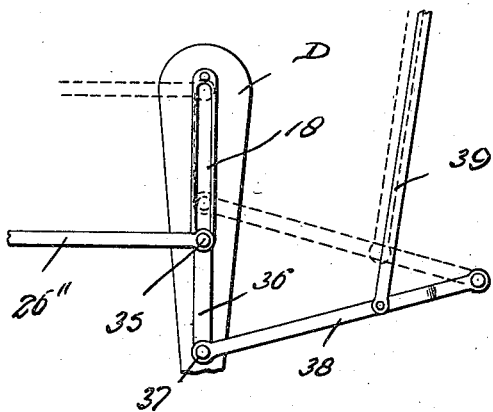
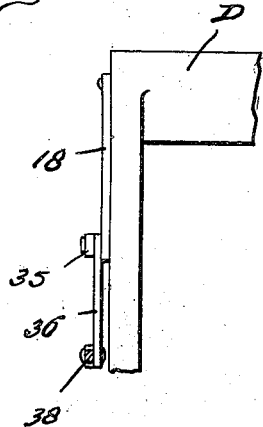
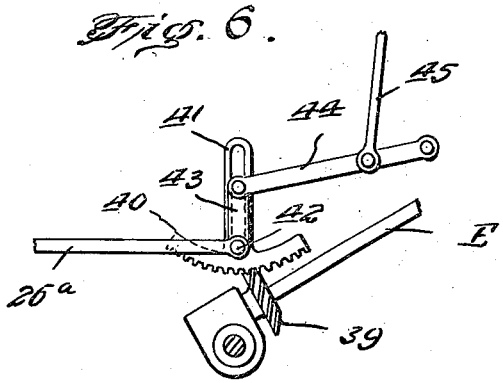
Witness.
F. C. Gibson.
Inventor
Floyd E. Kline.
By Clarence A. O'Brien
Attorney Patented June 24, 1924.                                         1,498,692

UNITED STATES PATENT OFFICE.

FLOYD EDWIN KLINE, OF LOWVILLE, NEW YORK.

DIRIGIBLE-HEADLIGHT CONSTRUCTION FOR MOTOR VEHICLES.

Application filed July 14, 1923. Serial No. 651,479.

*To all whom it may concern:*

Be it known that FLOYD E. KLINE, a citizen of the United States, residing at Lowville, in the county of Lewis and State of New York, has invented certain new and useful Improvements in Dirigible-Headlight Constructions for Motor Vehicles, of which the following is a specification.

In carrying out the present invention, it is my purpose to provide a headlight construction for motor vehicles, wherein the headlights are supported for rotation, and are so connected to the steering mechanism of the motor vehicle, whereby the same will be moved simultaneously with the swinging of the steering wheels of the vehicle, for thereby directing the light rays from the headlights in the general direction that the vehicle is travelling.

A further purpose of the invention is the provision of such a headlight construction for vehicles, wherein means is provided for operatively disconnecting said headlights from the steering mechanism of the vehicle, for allowing the same to be steered in the day time without affecting a rotary movement of the headlights as above set forth.

A still further purpose of my invention is to provide such a headlight construction, wherein the same may be associated with practically all types of motor vehicles, and wherein the same operates effectively under all conditions, and this without impairing the operating efficiency of the steering mechanism of the motor vehicle, to which my construction is applied.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1—is an elevation with parts broken away of the front side of a motor vehicle equipped with my improved headlight construction.

Figure 2—is an enlarged elevational view of the specific connecting means between the usual steering arm of the vehicle steering mechanism, and the headlight operating bar.

Figure 3—is a side elevation of Figure 2.

Figure 4—is a view similar to Figure 2, disclosing a modified form of connecting means between the vehicle steering arm and the operating rod for the headlights, certain of these elements being shown in both full and dotted line positions.

Figure 5—is a side elevational view thereof.

Figure 6—is a side elevation partly in cross section of yet another modified form of connection between the steering mechanism and the operating rod for the headlights.

Figure 7—is a view similar to Figure 4 in a still further modified form of connecting mechanism between the vehicle steering arm and the connecting rod for the headlights.

Figure 8—is a side elevation thereof.

As a means for turning the headlight simultaneously with the movement of the steering mechanism of the vehicle, there is provided as shown in Figures 2 and 3, a plate 18, that is secured at its opposite ends to the usual steering arm D of the vehicle steering mechanism, which plate 18 is secured to the upper end of said steering arm and extends parallel therewith. Rearwardly of this steering arm D, and secured to the adjacent frame bar of the vehicle chassis is a pendant L-shaped bracket 19, the front end of which is bent upwardly at 20, and carries a pair of headed pins 21, that extend through a vertical slot in the vertical lug 22 of the T plate 23. The cross plate of this T plate 23, which is designated 24 is of slightly arcuate shape, and is formed with a cross slot as shown in Figure 2, and engaging through the cross slot in this portion of the T plate 23, as well as within the slot of the plate 18 carried by the steering arm D is an inwardly projecting pin 25 carried by one end of a connecting rod 26. This connecting rod 26 extends forwardly and is connected at its opposite end to one arm of a bell crank that is suitably pivotally secured to a convenient point of the motor vehicle. Pivotally secured to the other arm of the bell crank 27 is the lower end of a link rod 28, the upper end thereof being pivotally connected with the headlight 8.

From an inspection of Figures 2 and 3, it will at once be apparent that when the T plate 23 is positioned as shown, a swinging movement of the arm D will occasion a movement for moving the headlights 8 in the general direction that the vehicle is travelling. For operatively disconnecting the said headlights 8 from the vehicle steering mechanism there is provided a bell crank 30 pivoted to the said chassis bar of the vehicle that carries the L-shaped bracket 19, the forward arm of this bell crank having pivotal connection to the said T plate 23. The other arm of the bell crank 30 is connected to one end of a control rod 31 that extends in a rearward inclined direction, and is passed through the dash board of the vehicle, whereby the same may be moved by the operator thereof. It will, of course, be apparent that a rearward pull upon the member 31 will occasion a raising of the T plate 23, and manifestly, an upward movement of the rod 26 within the slot of the plate 18, whereby the steering arm D may be moved without a consequent movement of said rod 26.

Now, having particular reference to Figures 4 and 5, the steering arm D is provided in this instance also with a plate 18 that is slotted as shown, and through which extends the inner end of a pivot pin 35 between the connecting rod 26'' and a connecting link 36, the lower end of this connecting link being pivoted at 37 to the forward end of the rearwardly directed arm 38 that is suitably pivotally secured to the vehicle chassis bar at its opposite end. Pivoted to this arm 38, intermediate its ends, is an operating rod 39 that extends rearwardly in a manner similar to the operating rod 31 of the mechanism shown in Figure 1.

The form of the invention shown in Figure 6: The vehicle steering post E is equipped adjacent to its lower end with a worm gear 39 that has mesh with the teeth of the curved segment 40. This segment fastened pivotally to a suitable support, is provided centrally with an upwardly extending slotted arm 41, and through the connecting rod 26$^a$ is pivotally connected at 42 to the lower end of a link 43 that extends parallel with the slotted arm 41 of the segment 40, the inner end of this pivot 42 extending through the slot therein. The upper end of said link 43 is pivotally connected to the front end of a rearwardly extending connecting arm 44 that is pivotally connected at its opposite end to the underframe of the vehicle and pivotally secured to this element 44 is an actuating rod 45 similar to the actuating rod 39 in Figure 4, it being of course understood that when the elements are positioned as shown in this figure a movement of the segment will consequently control the movement of the rod 26$^a$ of the headlight mechanism. An upward sliding movement of the link 43 will position the pivot pin 42 in the upper end of the slotted pin segment arm 41 for sectionally overcoming any movement of the connecting rod 26$^a$ when the segment 40 is moved.

With reference to Figures 7 and 8 the steering arm D in this instance carries a flatlike rod 51 that is spaced a slight distance away from said steering arm through the medium of inwardly extending ears 52, formed upon opposite ends of the rod, and that are secured to the steering arm D by rivets or the like. Freely slidable over said flatlike rod is a collar 53, to which is pivotally secured the inner end of the headlight control rod 26$^c$, as well as the upper end of a link 54, this link 54 being actuated through the medium of a rod, not shown, similar to the rods 38 and 39 and 44 and 45, respectively, of Figures 4 and 6.

Having thus described my invention, what I claim as new, and desire to secure by Letters Patent, is:

In combination with a steering mechanism having a steering arm mounted for turning movement about an axis and a dirigible lamp, a slotted plate mounted upon the arm and having one end of the slot coincident with the axis about which the said arm turns, a stud mounted for movement along the slot of the plate, a rod operatively connecting the stud with the lamp, a link member loosely connected with the stud, and means for moving the link member whereby the stud may be moved along the slot of the plate.

In testimony whereof he affixes his signature.

FLOYD EDWIN KLINE.